United States Patent
Lambert

(10) Patent No.: US 8,953,791 B2
(45) Date of Patent: Feb. 10, 2015

(54) KEY DERIVATIVE FUNCTION FOR NETWORK COMMUNICATIONS

(75) Inventor: Paul A. Lambert, Mountain View, CA (US)

(73) Assignee: Marvell World Trade Ltd. (BB)

(*) Notice: Subject to any disclaimer, the term of this patent is extended or adjusted under 35 U.S.C. 154(b) by 0 days.

(21) Appl. No.: 13/562,816

(22) Filed: Jul. 31, 2012

(65) Prior Publication Data

US 2013/0042313 A1    Feb. 14, 2013

Related U.S. Application Data

(60) Provisional application No. 61/521,231, filed on Aug. 8, 2011.

(51) Int. Cl.
*H04L 9/00* (2006.01)
*H04W 12/04* (2009.01)
*H04L 29/06* (2006.01)

(52) U.S. Cl.
CPC .......... *H04W 12/04* (2013.01); *H04L 63/065* (2013.01)
USPC .............. 380/44; 380/277; 726/7; 713/171

(58) Field of Classification Search
CPC ............................ H04L 63/065; H04W 12/04
USPC .................... 380/44, 277; 726/7; 713/171
See application file for complete search history.

(56) References Cited

U.S. PATENT DOCUMENTS

| | | | | |
|---|---|---|---|---|
| 6,128,391 A * | 10/2000 | Denno et al. | | 380/283 |
| 7,234,058 B1 * | 6/2007 | Baugher et al. | | 713/163 |
| 8,826,015 B2 * | 9/2014 | Lakshminarayanan et al. | | 713/168 |
| 2003/0145203 A1 * | 7/2003 | Audebert et al. | | 713/169 |
| 2006/0002560 A1 * | 1/2006 | Matsubara | | 380/270 |
| 2007/0198836 A1 | 8/2007 | Fedyk et al. | | |
| 2011/0293093 A1 * | 12/2011 | Sun et al. | | 380/211 |
| 2012/0257756 A1 * | 10/2012 | Huang et al. | | 380/281 |

OTHER PUBLICATIONS

Patent Cooperation Treaty (PCT) International Search Report and Written Opinion issued in co-pending International Application No. PCT/US2012/048977 (International Filing Date: Jul. 31, 2012) having a Date of Mailing of Nov. 30, 2012 (10 pgs).

* cited by examiner

*Primary Examiner* — Samson Lemma

(57) ABSTRACT

Systems, methods, and other embodiments associated with deriving group keys used to securely communicate in a wireless mesh network are described. According to one embodiment, a controller, for calculating group keys used to secure communications to a plurality of remote devices in a network, includes a key logic configured to calculate a group key by using a group master key and unique information about a remote device of the plurality of remote devices. The plurality of remote devices are configured in a mesh topology. The group key is for securing communications with the remote device. The controller also includes a communication logic configured to secure a communication by using the group key. The communication is to be transmitted to the remote device.

21 Claims, 3 Drawing Sheets

KEY DERIVATIVE FUNCTION FOR NETWORK COMMUNICATIONS

CROSS REFERENCE TO RELATED APPLICATIONS

This patent disclosure claims the benefit of U.S. Provisional Application No. 61/521,231 filed on Aug. 8, 2011, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Computers in a network can be arranged into many different topologies. For example, a network can be configured in a star topology, a mesh topology, a ring topology, and so on. In a network configured in a star topology, a central point (e.g., an access point (AP)) communicates directly with client devices and controls network functions (e.g., key generation/distribution, network access) for the client devices. By contrast, in a network configured in a mesh topology, each device communicates with many other devices to create a network that resembles, for example, a web of connections. A mesh network employs distributed techniques that do not rely on a central point to control network functions. Employing distributed techniques can be computationally intensive. For example, on the order of $N^2$ communications (where N is the number of devices in the network) can be necessary to perform functions in a mesh network.

As an example, consider performing a key distribution function in a star topology network versus a mesh topology network. In a star topology network, only a single group key is required. This is because all messages are sent directly from the access point to devices in the network and devices do not communicate with each other directly. Thus, distributing a new key to all devices in the star topology network requires, for example, 4N messages.

However, in a mesh topology network, each device uses a specific group key when communicating with another device. This is because devices can communicate directly without using a central point. Accordingly, each device needs to know the specific group keys of all of the devices in the mesh topology network. The group keys for each device must be exchanged between every other device on the network, which is performed by exchanging multiple messages between each pair of devices. To distribute keys for each device in a network of N devices, 4N(N−1) communications may be required. Now, consider a network with 30 devices (N=30). A star topology network uses 120 communications (4×30) to distribute a new key. By contrast, a mesh topology network uses 3,480 communications (4×30(30−1)) to distribute new keys. In this example, the mesh topology network requires twenty nine times more communications than the star topology network. Accordingly, distributing keys in the mesh topology network uses many communications that can cause difficulties with efficiently establishing shared keys.

SUMMARY

In one embodiment, a controller, for calculating group keys used to secure communications to a plurality of remote devices in a network, includes a key logic configured to calculate a group key by using a group master key and unique information about a remote device of the plurality of remote devices. The plurality of remote devices are configured in a mesh topology. The group key is for securing communications with the remote device. The controller also includes a communication logic configured to secure a communication by using the group key. The communication is to be transmitted to the remote device.

In another embodiment, the key logic is configured to calculate the group key by using the group master key and the unique information with a hash function to produce the group key.

In another embodiment, the key logic is configured to calculate a different group key for each of the plurality of remote devices in the network by using the group master key and unique information about each of the plurality of remote devices.

In another embodiment, the unique information includes a unique identifier of the remote device.

In another embodiment, the unique information includes a nonce of the remote device.

In another embodiment, the communication logic is configured to acquire the group master key from one of a communication received in response to a request to one of the plurality of the remote devices, wherein the request is a request to join the network, or an out-of-band input.

In another embodiment, the communication logic is further configured to acquire the unique information by: sniffing wireless communications of the network, or causing the remote device to transmit the unique information in response to a request.

In one embodiment, a method, for calculating group keys used to secure communications between a wireless device and a plurality of remote devices in a network, includes calculating, by the wireless device, a group key by using a group master key and unique information about a remote device of the plurality of remote devices. The plurality of remote devices are configured in a mesh topology. The group key is for securing communications with the remote device. The method also includes securing a communication to be transmitted to the remote device by using the group key.

In another embodiment, the method includes calculating the group key using the group master key and the unique information with a hash function to produce the group key.

In another embodiment, the method includes calculating a different group key for each of the plurality of remote devices in the network by using the group master key and unique information about each of the plurality of remote devices.

In another embodiment, the unique information includes a unique identifier of the remote device.

In another embodiment, the unique information includes a nonce of the remote device.

In another embodiment, the group master key is acquired from one of, a communication received by the wireless device in response to a request to one of the plurality of the remote devices, wherein the request is a request to join the network, or an out-of-band input.

In another embodiment, the method includes acquiring, by the wireless device, the unique information by sniffing wireless communications of the network, or causing the remote device to transmit the unique information in response to a request.

In one embodiment, a non-transitory computer-readable medium storing computer executable instructions that when executed by a computer cause the computer to perform a method that includes acquiring, by the computer, a group master key. The group master key is a cryptographic key for securing communications among a plurality of devices in a network. The group master key is assigned to the plurality of devices. The network is configured in a mesh topology. The method also includes generating, by the computer, a group key by using the group master key and unique information about a device of the plurality of devices.

In another embodiment, acquiring the group master key includes receiving a communication by the computer in response to a request to one of the plurality of the devices.

In another embodiment, acquiring the group master key includes receiving the group master key from an out-of-band input.

In another embodiment, the method includes acquiring, by he computer, the unique information by sniffing wireless communications from the network.

In another embodiment, generating the group key includes calculating the group key by using the group master key and the unique information with a hash function to derive the group key.

In another embodiment, the unique information includes a unique identifier of the device, the mesh topology includes a plurality of wireless connections linking the plurality of devices, and generating the group key includes generating a different group key for each of the plurality of devices.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with deriving group keys used to securely communicate in a mesh network. In one embodiment, devices in a wireless mesh network locally derive group keys of other devices from a group master key. By deriving the group keys from the group master key, the devices avoid transmitting a multiplicity of management communications on the wireless mesh network in order to exchange group keys between each of the devices. In this way, a number of communications transmitted on the network is reduced and efficiency of the network is improved.

Figure 1:
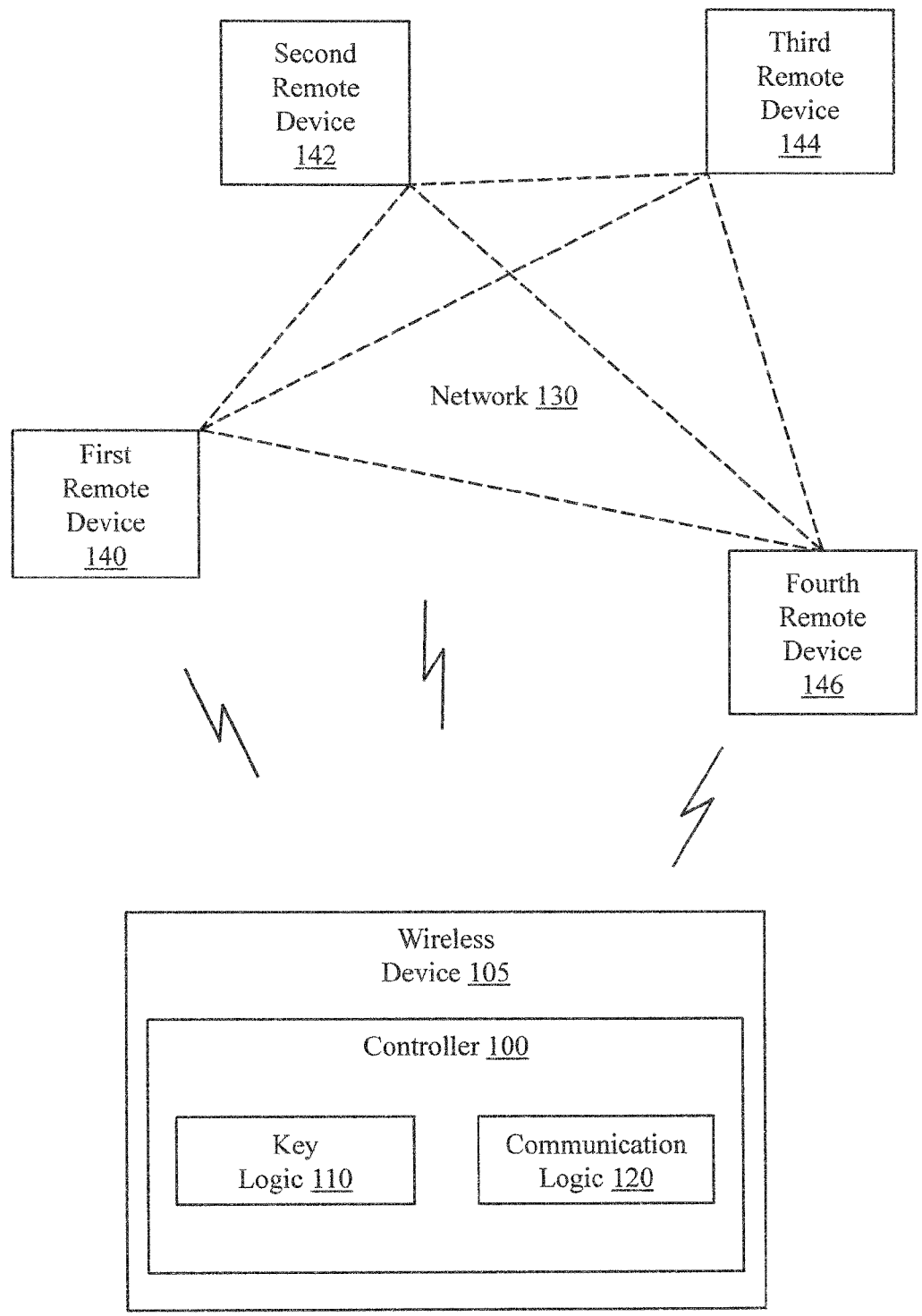
FIG. 1 illustrates one embodiment of a controller associated with deriving group keys used to securely communicate in a wireless mesh network.

FIG. 1 illustrates one embodiment of a controller 100 that is associated with deriving group keys from a group master key. The controller 100 can be embodied in a wireless device 105 that is a smartphone, laptop computer, network interface card (MC), tablet computer, and no on. The controller 100 includes a key logic 110 that is configured to calculate group keys by using a group master key. The controller 100 also includes a communication logic 120 that is configured to use the group keys to encrypt communications transmitted on network 130. In one embodiment, the network 130 is a wireless network that includes a plurality of remote devices (e.g., 140, 142, 144, and 146). The plurality of remote devices 140, 142, 144, and 146 are connected wirelessly in a mesh topology. That is, each of the plurality of devices 140, 142, 144, and 146 can communicate directly with one another without using a centralized access point.

In FIG. 1, the dashed lines between the remote devices 140, 142, 144, and 146 represent the wireless connections that form the mesh topology. While the remote devices 140, 142, 144, and 146 are illustrated with wireless connections to each device, many different configurations are possible in a mesh topology network. For example, the first remote device 140 may have connections to less than all of the other remote devices 142, 144, and 146. That is, the first remote device 140 may not have a direct connection to the fourth remote device 146. This can be due to several circumstances, such as, a distance between the devices being too far, and so on.

Thus, the first remote device 140 may communicate with the fourth remote device 146 via the second remote device 142 or the third remote device 144. Accordingly, the network 130 can take many different forms that are within the scope of a mesh topology. In general, the mesh topology describes a network with many interconnections between devices. For example, a device (e.g., the first remote device 140) in the network 130 can directly connect with many other devices (e.g., 142, 144, and 146) and not just a single central access point that controls communications.

In the network 130, communications between devices are encrypted. Encrypting the communications protects against security risks, such as, eavesdropping, spoofing, and so on. Because the network 130 permits devices (e.g., 140, 142, 144, and 146) to communicate without using a central access point, each device uses a different unique group key for each device it communicates with. For example, a first group key is used between device 105 and device 140; and a different second group key is used between device 105 and device 142. In this way, communications in the network are secured while an identity of a device can be verified at the same time based on the unique group key for that device.

Devices in the network 130 use a group master key and unique information about each device to generate the unique group keys. Thus, to communicate with device 144 in the network 130, the wireless device 105 locally generates a unique group key for device 144 using the group master key and unique information about the device 144. Thus the unique group key for communicating with device 144 is not exchanged via multiple communication messages, which reduces traffic on the network.

The wireless device 105 can acquire the group master key in several different ways. The group master key is, for example, an 128 bit cryptographic key that is assigned to the network 130 and thus shared by all devices connected in the network 130. The group master key can be a symmetric key or an asymmetric key pair. The group master key is a secret key that is held in confidence by devices in the network 130. Only devices that are authorized to communicate in the network 130 possess the group master key. In this way, devices that are part of the network 130 can ensure the security of calculated group keys through the confidence of the group master key.

Acquiring the group master key will be discussed in greater detail with respect to FIG. 2. For now, consider that the communication logic 120 in the wireless device 105 acquires the group master key in response to the wireless device 105 joining the network 130.

Even though the wireless device 105 has acquired the group master key, the unique information about another device must also be acquired. Because the group keys are individualized for a specific remote device, until unique information about a remote device (e.g., the first remote device 140) is known, the key logic 110 cannot calculate a group key for that remote device.

The unique information about a remote device can include any information that uniquely identifies the remote device. For example, the unique information can include a unique identifier of the remote device, such as, a media access control (MAC) address, an Internet protocol (IP) address, a security identifier, a host name, a certificate identifier, and so on. In another embodiment, the unique information also includes a nonce for the remote device. The nonce is a secret number (e.g., a 128 bit pseudo-random number), a second unique identifier of the remote device, or other unique value.

While the communication logic 120 may acquire the unique information along with the group master key as part of joining the network 130, the unique information may also be acquired in several other ways. For example, the communication logic 120 can acquire the unique information after joining the network 130 in a separate information capture process.

In one embodiment, the information capture process can include passive and/or active functions. For example, the communication logic 120 passively acquires the unique information either before or after joining the network 130. That is, the communication logic 120 can listen (e.g., sniff) for a communication transmitted by the remote device. Because some information in the communication, such as, the MAC address is not encrypted, the communication logic 120 can wait for the remote device to transmit a communication and read the unencrypted information from the communication. Thus, packet sniffing permits the communication logic 120 to acquire the unique information without transmitting additional communications on the network 130.

In another embodiment, the communication logic 120 actively acquires the unique information. That is, the communication logic 120 causes the remote device to transmit the unique information. For example, the communication logic 120 transmits a communication to the first remote device 140 that induces the first remote device 140 to transmit a reply communication. The reply communication includes the unique information, e.g., a MAC address or other unique information. The communication from the communication logic 120 may be a probe request, a beacon, a connection request, and so on.

In general, when actively causing a remote device to transmit the unique information, any communication that elicits a reply is sufficient. However, when the unique information also includes a nonce, the remote device may require additional authentication information from the wireless device 105. The additional authentication information may include a security credential or some other information to verify the identity of the wireless device 105. Additionally, the nonce may be encrypted in the reply communication in order to protect against security concerns (e.g., eavesdropping). The nonce can be encrypted with, for example, the group master key, which is also used to decrypt the nonce when the reply is received by the wireless device 105.

Once the key logic 110 has (1) the group master key, and (2) unique information about a remote device, a group key specific for the remote device can be calculated by using the two pieces of information. For example, the key logic 110 uses the group master key and the unique information (e.g., a MAC address) as input to a cryptographic hash function to calculate the group key. The hash function is, for example, the MD5 hash function, SHA-0 hash function, SHA-1 hash function, SHA-2 hash function, SHA-3 hash function, a hash function that is compatible with the secure hash standard (SHS), and so on. In other embodiments, the group master key and the unique information can be combined and/or processed with a different function to produce a unique value for the group key.

The result of the calculation is, in one embodiment, a 128 bit key that is used as the group key for the remote device. The group key is a cryptographic key that is used by the communication logic 120 to encrypt a payload of a communication transmitted to the remote device. The group key can also be used to decrypt communications from the remote device. The group key can be a symmetric key or an asymmetric key pair. In this way, the key logic 110 calculates a different group key for each remote device (e.g., 140, 142, 144, and 146) with which the wireless device 105 communicates.

Further details of the controller 100 will be discussed in conjunction with FIG. 2. FIG. 2 illustrates one embodiment of a method 200 associated with deriving group keys from a group master key. FIG. 2 is discussed from the perspective that the method 200 is implemented and performed by the wireless device 105 of FIG. 1.

Method 200 begins, at 210, when the wireless device 105 acquires the group master key. In one embodiment, the group master key is acquired as a result of an authentication process with a remote device that is already a member of the network 130. For example, consider that the wireless device 105 wishes to join the network 130. In order to join the network 130, the wireless device 105 needs to be authenticated by a remote device (e.g., the first remote device 140) that is a member of the network 130. Thus, the wireless device 105 transmits a request to the first remote device 140. The request is a request to join the network 130. The request may include authentication information, such as, a security credential, a security certificate with a public key, a unique identifier, a password, a combination of these elements, and so on. In this way, the first remote device 140 can authenticate the wireless device 105 before transmitting the group master key to the wireless device 105.

Transmitting the group master key to the wireless device 105 can occur in several different ways. One example of how the group master key is transmitted to the wireless device 105 includes performing a secure four-way handshake between the first remote device 140 and the wireless device 105. The four-way handshake permits the group master key to be transmitted to the wireless device in a secure manner. In another embodiment, the wireless device 105 and the first remote device 140 perform a Diffie-Hellman key exchange or another secure exchange of the group master key.

In another embodiment, the first remote device 140 can acquire the group master key without requesting to join the network 130. Instead of requesting to join the network 130, the wireless device can be, for example, pre-authenticated with the network 130. Thus, the wireless device 105 can simply request the group master key without requesting to join the network 130.

In yet another embodiment, the wireless device 105 acquires the group master key from an out-of-band process. For example, the wireless device 105 acquires the group master key by manual entry from a user, through a wired connection with another device, through a Bluetooth connection with another device, through a Wi-Fi direct connection with another device, through insertion of a flash memory stick into the wireless device 105, and so on. By using an out-of-band process to acquire the group master key, security concerns associated with communicating in the network 130 can be avoided. Thus, the out-of-band process can improve security for transferring the group master key.

At 220, the unique information for a remote device in the network is acquired. The unique information is for a remote device with which communications are to occur. While block 220 of the method 200 is discussed with reference to a single remote device, unique information for more than the single remote device may be acquired at 220. In general, the wireless device 105 can acquire unique information for each of the plurality of remote devices (e.g., 140, 142, 144, and 146) in the network 130 and calculate a unique group key for each remote device in advance. In this way, subsequent communications in the network 130 are not delayed by having to wait for the wireless device 105 to calculate group keys for the plurality of remote devices. Thus, if the wireless device 105 receives a communication from a remote device in the network 130, then no delay occurs after the communication is received (delay for acquiring unique information and calculating a group key) since all of the group keys have been previously calculated.

For example, the wireless device 105 may first communicate with the first remote device 140 to join the network 130, or for other purposes. However, other communications in the network 130, such as, management frames, beacons, and so on may be transmitted by a different remote device (e.g., the third remote device 144) using a different group key. In order for the wireless device 105 to be able to decrypt the other communications, a group key for an associated transmitting device needs to be known. Accordingly, the wireless device 105 acquires unique information for the plurality of remote devices in order to calculate the group keys at 230 and avoid delays from acquiring information and calculating keys on the fly.

Figure 2:
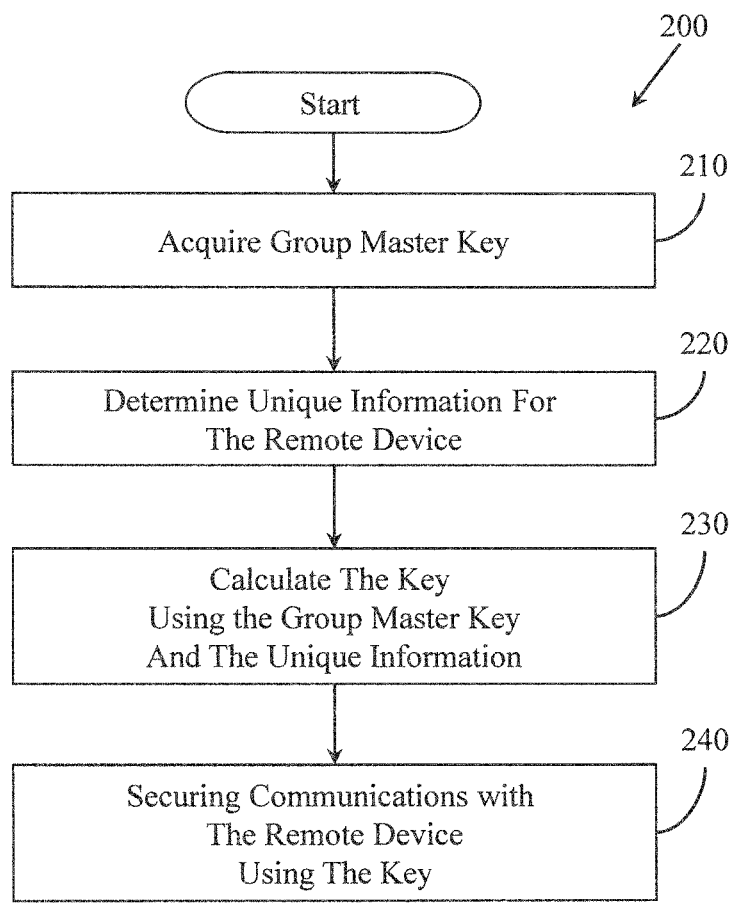
FIG. 2 illustrates one embodiment of a method associated with deriving group keys used to securely communicate in a wireless mesh network.

While block 220 is illustrated as occurring after block 210 in FIG. 2, block 220 can occur simultaneously with block 210 or even prior to block 210. The wireless device 105 can acquire the unique information at any time prior to calculating the group key at 230. For example, the wireless device 105 may acquire the unique information as part of joining the network 130 when the group master key is also acquired. Alternatively, the unique information may be acquired prior to joining the network 130 and, thus, prior to acquiring the group master key.

As explained previously, the unique information is acquired either actively (e.g., through probe requests) or passively (e.g., by packet sniffing) from communications in the network 130. Furthermore, the unique information includes at least a unique identifier of a remote device for which a group key is to be calculated. The unique identifier may be an identifier such as a media access control (MAC) address that uniquely identifies a remote device for which a group key is to be calculated.

In another embodiment, the unique information includes not only a unique identifier of the remote device but also a nonce. The nonce is, for example, a string of random numbers and/or characters that is a secret of the remote device. The nonce can be used along with the unique identifier to improve the strength of security for a calculated group key.

At 230, the group key is calculated. In one embodiment, calculating the group key occurs by using the unique information and the group master key as an input to a hash function. A resulting output of the hash function is the group key for the remote device associated with the unique information. While a hash function is discussed, of course, other functions may also be used to calculate the group key for a remote device. In general, any function that provides a secure group key as an output can be used. For example, a pseudo-random number generator can be seeded with the unique information and the group master key to generate the group key. In another embodiment, a transient-key (e.g., ephemeral key) generator can be used with the group master key and the unique information to provide group keys that sequentially change over time.

In addition to calculating the group key, at 230, a group key for each remote device in the network 130 can also be calculated at 230. Group keys for all of the remote devices are calculated using the same formula, e.g., $key_i$=hash (unique information, and group master key). In this way, a group key can be determined for each remote device in the network 130 using the unique information for that remote device and the group master key. The following examples show several formulas that may be used for calculating the group keys. The examples are not intended to be limiting.

EXAMPLES

1) $key_i$=f ($MAC_i$, group master key), where f is a function such as a secure cryptographic hash.
2) $key_i$=f ($MAC_i$, $nonce_i$, group master key).
3) $key_i$=f ($nonce_i$, group master key).
4) $key_i$=f (IP $address_i$, group master key).

At 240, the group key is used to secure communications with the remote device. In one embodiment, the group key is used with a cryptographic function to encrypt communications transmitted to the remote device. In another embodiment, the group key is used to decrypt communications from the remote device. Additionally, a group key for the wireless device 105 may be used to encrypt communications transmitted to the remote device. Thus, network overhead (e.g., key distribution communications) in a wireless mesh network can be reduced by using keys that are calculated locally by a device instead of using keys that are individually distributed between devices using multiple exchanges of messages.

Figure 3:
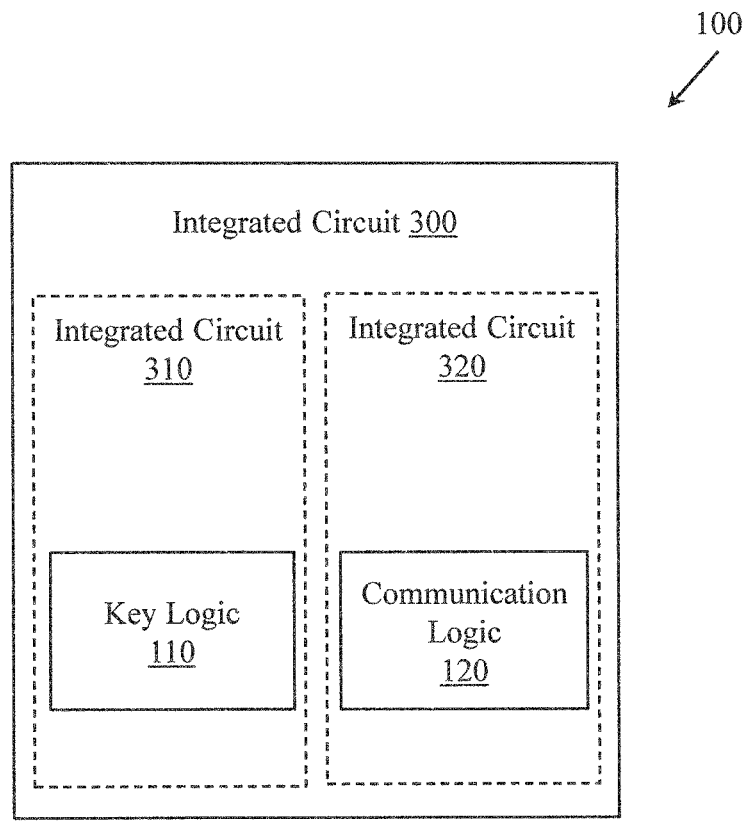
FIG. 3 illustrates one embodiment of an integrated circuit associated with deriving group keys used to securely communicate in a wireless mesh network.

FIG. 3 illustrates an additional embodiment of the controller 100 from FIG. 1 that is configured with separate integrated circuits and/or chips. In this embodiment, the key logic 110 from FIG. 1 is embodied as a separate integrated circuit 310. The communication logic 120 is embodied on an individual integrated circuit 320. The circuits are connected via connection paths to communicate signals. While integrated circuits 310 and 320 are illustrated as separate integrated circuits, they may be integrated into a common circuit board 300. Additionally, integrated circuits 310 and 320 may be combined into fewer integrated circuits or divided into more integrated circuits than illustrated. Additionally, in another embodiment, the key logic 110 and the communication logic 120 (which are illustrated in integrated circuits 310 and 320 respectively) may be combined into a separate application-specific integrated circuit. In other embodiments, portions of the functionality associated with the key logic 110 and the communication logic 120 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) no described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A controller for calculating group keys used to secure communications to a plurality of remote devices in a network, wherein the plurality of remote devices are configured in a mesh topology, the controller comprising:
a key logic implemented, at least in part, in hardware, wherein the key logic is configured to calculate a first group key by using a group master key, and (ii) and information that comprises a unique identifier that uniquely corresponds to a first remote device of the plurality of remote devices, wherein the first group key is a key for communicating to the first remote device and wherein communications received from the first remote device are encrypted with a different second group key; and
a communication logic configured to secure a communication by using the first group key, wherein the communication is to be transmitted to the first remote device and wherein the first group key is distinct from the second group key.

2. The controller of claim 1, wherein the key logic is configured to calculate the first group key by using (i) the group master key and (ii) the information that includes the unique identifier as inputs to a hash function to produce the first group key.

3. The controller of claim 1, wherein the key logic is configured to respectively calculate, for each particular remote device of the plurality of remote devices in the network, a respective group key by using (i) the group master key, and (ii) information that uniquely corresponds to the particular remote device.

4. The controller of claim 1, wherein the information that uniquely corresponds to a particular remote device includes a unique identifier that uniquely corresponds to the particular remote device.

5. The controller of claim 4, wherein the information that uniquely corresponds to the particular remote device includes a nonce of the particular remote device.

6. The controller of claim 1, wherein the communication logic is configured to acquire the group master key from one of:
a communication received in response to a request to one of the plurality of the remote devices, wherein the request is a request to join the network, or
an out-of-band input.

7. The controller of claim 1, wherein the communication logic is further configured to acquire the information that includes the unique identifier that uniquely corresponds to the first remote device by:
sniffing wireless communications of the network, or
causing the first remote device to transmit the information in response to a request.

8. A method for calculating group keys used to secure communications between a wireless device and a plurality of remote devices in a network, wherein the plurality of remote devices are configured in a mesh topology, the method comprising:
calculating, by the wireless device, a first group key by using (i) group master key and (ii) information that comprises a unique identifier that uniquely corresponds to a remote device of the plurality of remote devices, wherein the first group key is a key for securing communications transmitted to the remote device, and wherein the first group key is a key for communicating to the remote device and wherein communications received from the remote device are encrypted with a second group key; and
securing a communication to be transmitted to the remote device by using the first group key and wherein the first group key is distinct from the second group key.

9. The method of claim 8, wherein calculating the first group key includes using the group master key and the information as inputs to a hash function to produce the first group key.

10. The method of claim 8, further comprising:
respectively calculating, for each particular remote device of the plurality of remote devices in the network, a respective group key by using the group master key and information that uniquely corresponds to each particular remote device of the plurality of remote devices.

11. The method of claim 10, wherein the information that uniquely corresponds to each particular remote device of the plurality of remote devices includes a unique identifier.

12. The method of claim 11, wherein the information that uniquely corresponds to each particular remote device of the plurality of remote devices includes a nonce.

13. The method of claim 8, wherein the group master key is acquired from one of:
a communication received by the wireless device in response to a request to one of the plurality of the remote devices, wherein the request is a request to join the network, or
an out-of-band input.

14. The method of claim 8, further comprising:
acquiring, by the wireless device, the information that uniquely corresponds to the remote device by:
sniffing wireless communications of the network, or
causing the remote device to transmit the unique information in response to a request.

15. A non-transitory computer-readable medium storing computer executable instructions that when executed by a computer cause the computer to perform a method, the method comprising:
acquiring, by the computer, a group master key, wherein the group master key is a cryptographic key for securing communications among a plurality of devices in a network, wherein the group master key is assigned to the plurality of devices, and wherein the network is configured in a mesh topology; and
generating, by the computer, a first group key by using the group master key and information that uniquely corresponds to a first remote device and comprises a unique identifier of the first remote device of the plurality of devices, wherein the first group key is a key for communicating to the first remote device, wherein communications received from the first remote device are encrypted with a second group key and wherein the first group key is distinct from the second group key.

16. The non-transitory computer-readable medium of claim 15, wherein acquiring the group master key includes receiving a communication by the computer in response to a request to one of the plurality of the devices.

17. The non-transitory computer-readable medium of claim 15, wherein acquiring the group master key includes receiving the group master key from an out-of-band input.

18. The non-transitory computer-readable medium of claim 15, further comprising:
acquiring, by the computer, the information that uniquely corresponds with the first remote device by sniffing wireless communications from the network.

19. The non-transitory computer-readable medium of claim 15, wherein generating the first group key includes calculating the first group key by using (i) the group master key and (ii) the unique information as inputs to a hash function to derive the first group key.

20. The non-transitory computer-readable medium of claim 15, wherein the unique information includes a unique identifier of the first remote device, wherein the mesh topology includes a plurality of wireless connections linking the plurality of devices, and wherein generating the first group key includes generating a respective group key for each of the plurality of devices.

21. A non-transitory computer-readable medium storing computer executable instructions that when executed by a computer cause the computer to perform a method for calculating group keys used to secure communications to a plurality of remote devices in a network, wherein the plurality of remote devices are configured in a mesh topology, the non-transitory computer-readable medium comprising instructions for:
calculating, by the computer, a first group key by using (i) a group master key, and (ii) and information that comprises a unique identifier that uniquely corresponds to a first remote device of the plurality of remote devices, wherein the first group key is a key for securing communications to the first remote device, wherein the first group key is a key for communicating to the first remote device, and wherein communications received from the first remote device are encrypted with a second group key, wherein the first group key is a key for communicating to the first remote device; and
securing, by the computer, a communication by using the first group key, wherein the communication is to be transmitted to the first remote device and wherein the first group key is distinct from the second group key.

* * * * *